(12) United States Patent
Grote

(10) Patent No.: US 7,392,674 B1
(45) Date of Patent: Jul. 1, 2008

(54) LUG NUT LOCKING DEVICE

(76) Inventor: Jeff M. Grote, P.O. Box 714, Carroll, IA (US) 51401

( * ) Notice: Subject to any disclaimer, the term of this patent is extended or adjusted under 35 U.S.C. 154(b) by 0 days.

(21) Appl. No.: 11/326,974

(22) Filed: Jan. 6, 2006

Related U.S. Application Data

(60) Provisional application No. 60/641,846, filed on Jan. 6, 2005.

(51) Int. Cl.
*F16B 41/00* (2006.01)
(52) U.S. Cl. .............. 70/232; 70/259; 411/910
(58) Field of Classification Search ........... 70/232, 70/258, 259; 411/370–376, 403, 405, 910
See application file for complete search history.

(56) References Cited

U.S. PATENT DOCUMENTS

| | | | | |
|---|---|---|---|---|
| 1,604,690 | A | * | 10/1926 | Halaby .................. 70/231 |
| 1,748,422 | A | * | 2/1930 | Lee ...................... 70/232 |
| 1,786,201 | A | * | 12/1930 | Fishback ................ 70/231 |
| 1,900,146 | A | * | 3/1933 | Winkler ................. 70/232 |
| 1,937,848 | A | * | 12/1933 | Shinn ................... 70/231 |
| 2,316,695 | A | * | 4/1943 | Jaffa .................... 411/337 |
| 3,732,033 | A | * | 5/1973 | Macchi ................ 416/244 R |
| 3,981,617 | A | * | 9/1976 | Milewicz .............. 416/244 B |
| 4,161,869 | A | * | 7/1979 | Dixon ................... 70/166 |
| D255,540 | S | | 6/1980 | Baylis |
| 4,302,137 | A | * | 11/1981 | Hart .................... 411/432 |
| 4,336,698 | A | | 6/1982 | Hurd |
| 4,825,669 | A | | 5/1989 | Herrera |
| 4,869,633 | A | | 9/1989 | Hayashi |
| 4,870,842 | A | | 10/1989 | Plumer |
| 4,998,780 | A | | 3/1991 | Eshler et al. |
| 5,097,686 | A | | 3/1992 | Plumer |
| 5,131,796 | A | | 7/1992 | Herum et al. |
| 5,163,797 | A | | 11/1992 | Patti |
| 5,370,486 | A | | 12/1994 | Plummer |
| 5,595,422 | A | | 1/1997 | Ladouceur |
| D379,428 | S | | 5/1997 | Fling |
| 5,918,946 | A | | 7/1999 | DiMarco |
| D422,205 | S | | 4/2000 | Hussaini |
| D422,898 | S | | 4/2000 | Hussaini |
| D432,006 | S | | 10/2000 | Hussaini |
| 6,168,243 | B1 | | 1/2001 | Abrahams |
| D446,111 | S | | 8/2001 | Hussaini |
| 6,695,557 | B2 | * | 2/2004 | Hove et al. ............ 411/429 |
| 6,910,355 | B2 | * | 6/2005 | Swanson .............. 70/232 |

* cited by examiner

*Primary Examiner*—Lloyd A Gall
(74) *Attorney, Agent, or Firm*—McKee, Voorhees & Sease, P.L.C.

(57) ABSTRACT

A lug nut locking device is provided to prevent theft of vehicle wheels. The locking device includes a collar adapted to fit over the lug nut. A tube fits within the collar and has a threaded first end to threadably mount onto the lug bolt. The second end of the tube has an opening to receive a tool to tighten the tube onto the lug bolt. A lock cylinder slides into the tube and has a tab extendable by a key into a recess within the tube to lock the cylinder in the tube. A decorative cap frictionally fits over the collar to cover the lock cylinder. The collar and cap spin freely about the lug nut, to prevent use of a wrench while the lock device is mounted on the lug nut and bolt assembly.

12 Claims, 5 Drawing Sheets

LUG NUT LOCKING DEVICE

CROSS-REFERENCE TO RELATED APPLICATIONS

This application is a nonprovisional application of 60/641,846 filed Jan. 6, 2005.

BACKGROUND OF THE INVENTION

Automotive wheels are typically mounted on a hub using a lug nut which is tightened onto a lug bolt extending from or through the hub. Wheels and tires for cars and trucks often times are valuable, and thus may be stolen. For example, wheels and tires on over-the-road semi trucks have a value of at least $600 each. Theft of wheels for semi trucks is a problem in certain parts of the country, particularly when the trailer is parked and the tractor has been pulled away. Thieves can jack up the rear of the tractor to remove the wheels and tires, for example on unattended tractors in storage lots. Similarly, chrome wheels or mags on cars are attractive targets for thieves.

Accordingly, the primary objective of the present invention is the provision of a lug nut locking device to prevent and discourage wheel theft on trucks and trailers.

Another objective of the present invention is the provision of a lug nut locking device which can be quickly and easily mounted on one lug nut of a wheel so as to deter theft.

A further objective of the present invention is the provision of a lug nut locking device which requires a key for removal of the device from a lug nut.

Still another objective of the present invention is the provision of a lug nut locking device which cannot be remove solely by use of a wrench or other tool.

Yet another objective of the present invention is the provision of a locking device for a lug nut having a free-spinning collar surrounding the lug nut to prevent unthreading of the lug nut by a thief.

Still another objective of the present invention is the provision of a lug nut locking device having an ornamental, aesthetically pleasing appearance.

Another objective of the present invention is the provision of a lug nut locking device which is economical to manufacture, and durable, effective, and safe in use.

These and other objectives will become apparent from the following description of the invention.

BRIEF SUMMARY OF THE INVENTION

The lug nut locking device of the present invention mounts over a lug nut so as to prevent theft of a wheel and tire. The locking device includes a collar, a tube, and a lock cylinder. The tube fits within the collar and threads onto the lug bolt using a wrench or tool fit within the outer end of the tube. The lock cylinder fits within the outer end of the tube so as to plug the outer end, and locks in place with a key, such that a tool cannot be used to unthread the tube from the lug bolt. A decorative cap frictionally fits over the collar to cover the lock cylinder and to provide an ornamental appearance for the locking device. In an alternative embodiment, at least one O-ring is provided on the exterior of the collar to mate with the interior of the cap, thereby inhibit passage of dirt and other elements into the locking device. Another O-ring may be provided on the inside of the collar to mate with the tube to further inhibit passage of dirt and the like. In the alternative embodiment, an expandable C-clip is provided in a groove on the exterior of the tube and mates with a groove on the inside of the collar to retain the collar and tube together. In both embodiments, the collar is free to spin about the lug nut end of the tube, thereby preventing use of a wrench or other tool by a potential thief to remove the lug nut.

DETAILED DESCRIPTION OF THE PREFERRED EMBODIMENT

Figure 1:
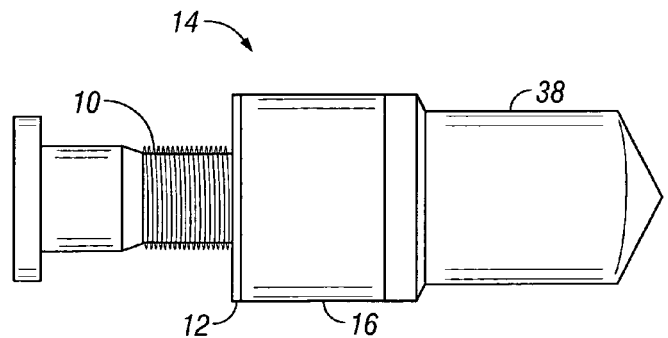
FIG. 1 is an elevation view of the assembled lock device on a lug nut and bolt assembly, without a wheel.
Figure 2:
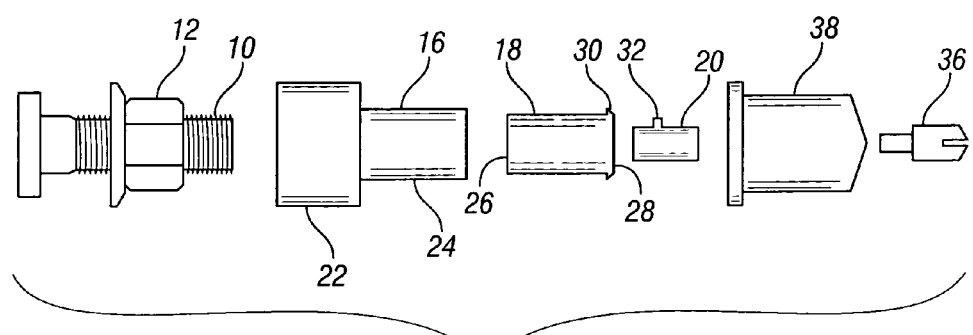
FIG. 2 is an exploded sectional view of the lock device and lug nut and bolt assembly, showing the components of the lock device.
Figure 3:
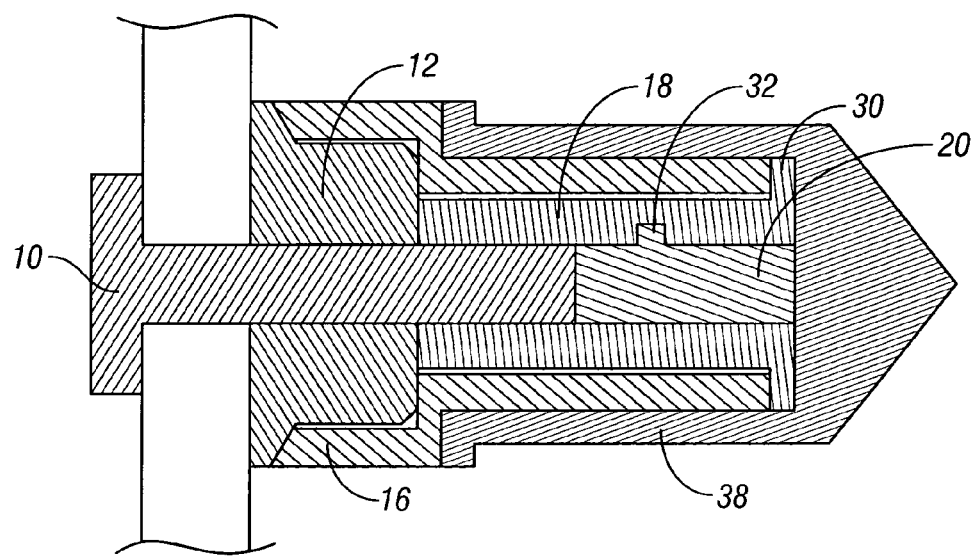
FIG. 3 is a sectional view of the assembled locking device mounted on a lug nut on a wheel.
Figure 4:
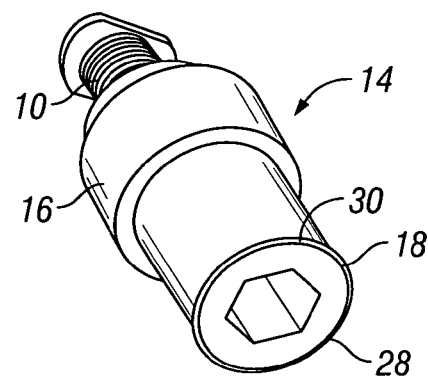
FIG. 4 is a perspective view of the assembled cylinder and tube of the locking device, without the wheel, and without the lock cylinder and the decorative cap, for clarity.
Figure 5:
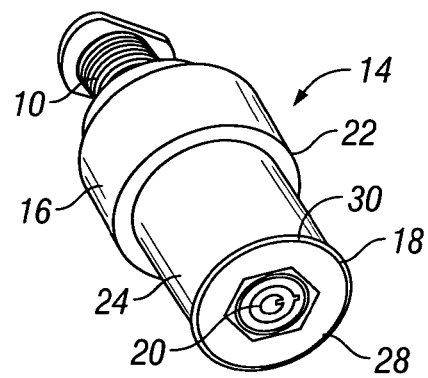
FIG. 5 is a view similar to FIG. 4, with the lock cylinder installed in the tube.
Figure 6:
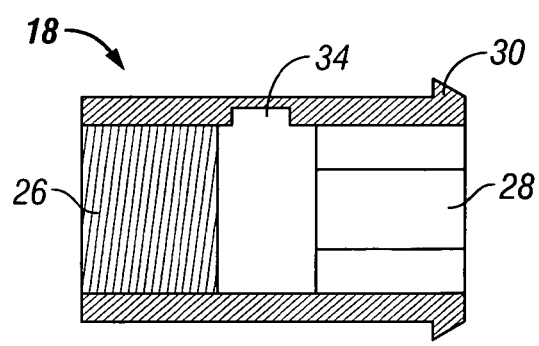
FIG. 6 is a sectional view of the tube of the lock device.

A lug bolt and lug nut are designated in the drawings by the references numerals 10 and 12, respectively, and are intended for use on a vehicle wheel 13. The lug bolt and nut 10, 12 can take various forms without departing from the scope of the present invention. For example, the bolt 10 may be fixed to the hub of the vehicle, or may be removably extended through the hub. The nut and bolt assembly 10, 12 do not constitute a part of the present invention.

The invention is directed towards a lug nut lock assembly or device 14 which mounts onto the lug bolt 10 so as to prevent removal of the lug nut 12. The lock assembly 14 includes a collar 16, a tube 18, and a lock cylinder 20. The collar 16 is hollow and includes a first end 22 adapted to fit over the lug nut 12. The internal bore of the collar 16 is cylindrical, such that the collar does not matingly fit on the lug nut 12, but rather spins freely about the nut 12. The second end 24 of the collar 16 is adapted to receive the tube 18, which slides into the collar 16.

The tube 18 has a first end 26 which is internally threaded for mounting the tube 18 onto the lug bolt 10. The second end 28 of the tube has an opening to receive a tool (not shown) to tighten the tube 18 onto the bolt 10. For example, as seen in the drawings, the second end 28 of the tube 18 has a hex opening. It is understood that the opening in the second end 28 of the tube 18 may have other shapes to receive a complementary shaped tool. The second end 28 of the tube 18 has an outer perimeter flange or lip 30 which engages the second end 24 of the collar 16 so as to retain the collar in position over the lug nut 12.

After the tube 18 is tightened onto the bolt 10, the lock cylinder 20 is inserted into the second end 28 of the tube 18. The cylinder 20 functions as a plug for the end of the tube 18. The lock cylinder 20 includes a tab or wafer 32 which is actuated by a key 36, so as to be moved between a retracted and extended position. The tab 32 is retracted when the cylinder 20 is slid into the tube 18, and then extended by the key 36 into an internal slot or recess 34 in the tube 18, so as to retain the cylinder 20 within the tube 18. The recess 34 may be an annular groove extending around the inner surface of the tube 18. When the tab 32 is extended into the recess 34, the cylinder 20 cannot be removed from the tube 18. When it is necessary to remove the lug nut 12, such as to change a flat tire or replace a tire, the key 36 must be used to retract the tab 32 on the cylinder 20, such that the cylinder 20 can be pulled from the tube 18, and thereby expose the second end 28 of the tube 18 for receipt of the tool to unthread the tube 18 from the bolt 10. The cylinder 20 may also include a pin (not shown) extending from the body and received within one of the points of the hex opening on the second end 28 of the tube 18, to prevent the cylinder 20 from rotating within the tube 18.

After the collar 16, tube 18 and cylinder 20 are installed on the lug nut assembly 10, 12, a decorative cap 38 may be pressed onto the collar 16, and retained by a friction fit. The cap 38 provides an ornamental appearance to the lock device 14, and protects the lock cylinder 20 from the elements.

In use, the collar 16 covers the lug nut 12, and freely spins about the nut 12 and about the tube 18. Therefore, a potential thief cannot turn the nut 12 from the bolt 10 while the locking device 14 is in place. The collar 16 prevents a potential thief from putting a monkey wrench or vice grip onto the tube 18, which is hidden within the collar 16. The opening at the second end 28 of the tube 18 is plugged by the cylinder 20, such that a tool cannot be inserted into the second end 28 of the tube 18 while the cylinder 20 is in place. Thus, the only way to remove a wheel, is to have a key 36 to remove the cylinder 20, and having a tool to fit the opening in the second end 28 of the tube 18. Thus, the lock assembly 14 prevents and deters theft of valuable wheels.

Figure 7:
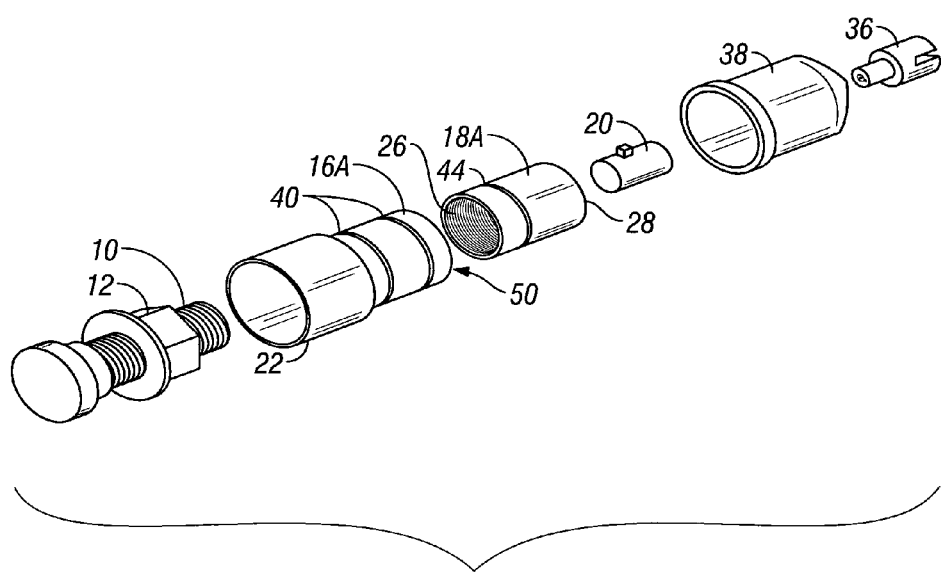
FIG. 7 is a view similar to FIG. 2 showing an alternative embodiment of the locking device.
Figure 8:
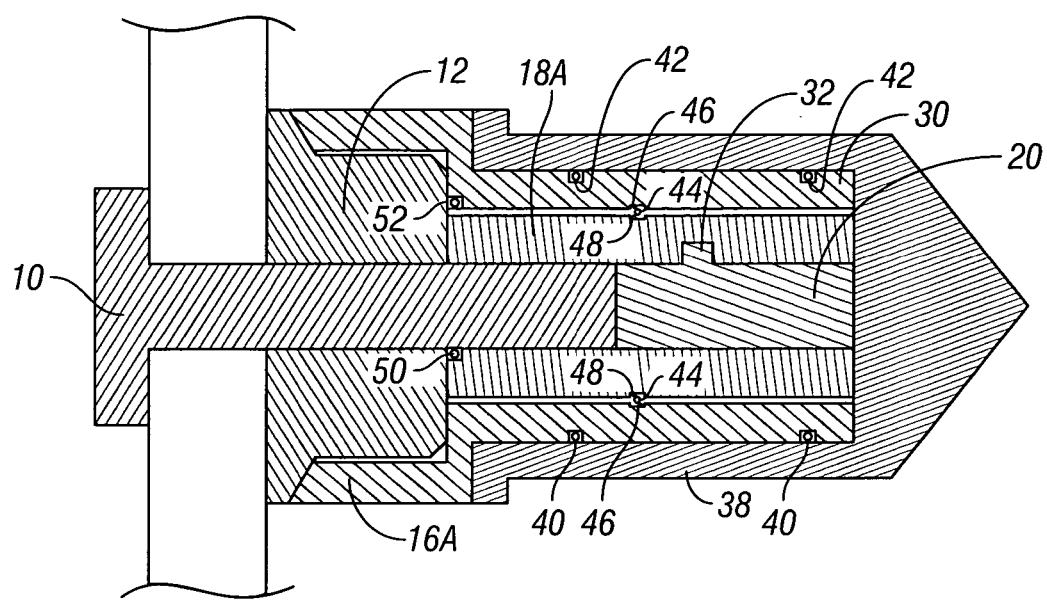
FIG. 8 is a view similar to FIG. 3 showing the alternative embodiment.
Figure 9:
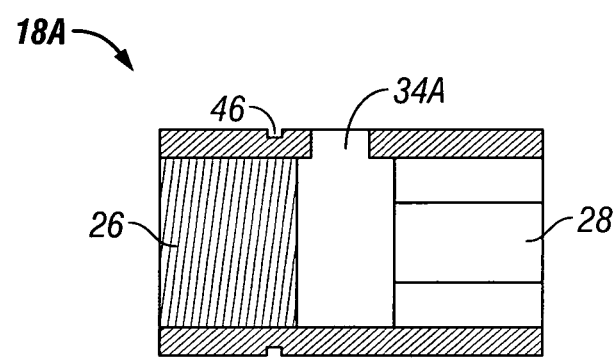
FIG. 9 is a view similar to FIG. 6 showing the alternative embodiment of the tube of the lock device.

An alternative embodiment of the locking device is shown in FIGS. 7-9. In the alternative embodiment, the collar 16A is provided with one or more O-rings 40 received in grooves 42 on the exterior of the collar 16. The O-rings 40 mate with the inside of the cap 38 to inhibit passage of dirt and other elements into the locking device. The alternative embodiment also includes a C-clip 44 mounted in a groove 46 on the exterior of the tube 18A. When the tube 18A is inserted into the collar 16A, the C-clip 44 expands into an internal groove 48 on the inside of the collar 16A thereby retaining the tube 18A in the collar 16A. Another O-ring 50 is received in a groove 52 on the inside of the collar 16A for sealing engagement with the outside of the tube 18A, to further inhibit passage of dirt and other elements into the locking device. Also, as seen in FIG. 9, in the alternative embodiment, a through-hole 34A is provided in the wall of the tube 18A for receipt of the tab 32 on the lock cylinder 30. The hole 34A is easier to manufacture in the tube 18A, than the internal recess 34 in the tube 18. The use of the collar 16A and tube 18A is the same as described above with respect to the collar 16 and tube 18.

It is understood that the lock assembly 14 of the present invention can be utilized on any type of wheel wherein the mounting bolts extend outwardly through the wheel. Also, only one locking device 14 needs to be used on each wheel. Weighted nuts (not shown) may also be added to the other lug nuts so as to balance the wheel. Additional decorative caps, similar to cap 38 in appearance, may be mounted over the weighted nuts or on the other lug nuts of the wheel, so as to provide a uniform appearance for all the lug nuts of each wheel.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of locking a lug nut on a lug bolt to secure a wheel on a vehicle, comprising:
    tightening the lug nut onto the lug bolt; then
    positioning a collar over the lug nut; then
    inserting a tube into the collar and threading the tube onto the lug bolt; and then
    inserting a lock cylinder into the tube and locking the cylinder in the tube; and
    allowing the collar to spin freely about the lug nut and tube.

2. The method of claim 1 further comprising using a key to move the lock cylinder between locked and unlocked positions.

3. The method of claim 1 further comprising using a tool matingly fit in one end of the tube to thread the tube onto the lug bolt.

4. The method of claim 1 further comprising placing a cap over an end of the lock cylinder.

5. A lock device for a lug nut mounted on a lug bolt to secure a wheel on a vehicle, comprising:
    a collar having a first end fit over the lug nut after the lug nut is tightened on the lug bolt;
    a tube inserted into a second end of the collar and threaded to the lug bolt inside the collar after the collar is fit over the nut;
    a plug locked in the tube to prevent unthreading of the tube from the lug bolt; and
    the collar has at least one O-ring to inhibit passage of dirt into the lock device.

6. The lock device of claim 5 further comprising a cap covering the plug.

7. The lock device of claim 5 wherein the tube has an internally threaded first end for receipt on the lug bolt and an opening on the second end adapted to receive a tool to turn the tube on the lug bolt.

8. The lock device of claim 5 wherein the plug is a lock cylinder with a tab moveable between locked and unlocked positions using a key.

9. The lock device of claim 5 wherein the tube has a recess to receive the tab in the locked position.

10. The lock device of claim 5 further comprising a C-clip on the tube to retain the collar and tube together.

11. A lock device for a lug nut mounted on a lug bolt to secure a wheel on a vehicle, comprising:
    a collar fit over the lug nut after the nut is tightened on the bolt;
    a tube threaded to the lug bolt inside the collar after the collar is fit over the nut;
    a plug locked in the tube to prevent unthreading of the tube from the lug bolt; and
    a C-clip on the tube to retain the collar and tube together.

12. The lock device of claim 11 wherein the tube has an internally threaded first end for receipt on the lug bolt and an opening on the second end adapted to receive a tool to turn the tube on the lug bolt.

* * * * *